F. W. & R. S. VAN FLEET.
CORNER JOINT FOR SCREEN AND OTHER FRAMES.
APPLICATION FILED FEB. 3, 1915.

1,161,169.

Patented Nov. 23, 1915.

Frederick W. Van Fleet,
Rodney S. Van Fleet,
INVENTORS

WITNESSES

BY

ATTORNEY

UNITED STATES PATENT OFFICE.

FREDERICK W. VAN FLEET AND RODNEY S. VAN FLEET, OF FOREST, OHIO, ASSIGNORS OF TWO-THIRDS TO SAID FREDERICK W. VAN FLEET AND ONE-THIRD TO SAID RODNEY S. VAN FLEET.

CORNER-JOINT FOR SCREEN AND OTHER FRAMES.

1,161,169.   Specification of Letters Patent.   Patented Nov. 23, 1915.

Application filed February 3, 1915. Serial No. 5,960.

*To all whom it may concern:*

Be it known that we, FREDERICK W. VAN FLEET and RODNEY S. VAN FLEET, citizens of the United States, residing at Forest, in the county of Hardin and State of Ohio, have invented a new and useful Corner-Joint for Screen and other Frames, of which the following is a specification.

The invention relates to improvements in corner joints for screen and other frames.

The object of the present invention is to improve the construction of corner joints and to provide a simple, practical, and inexpensive corner joint designed for use on screen and other frames and adapted to present the appearance of a mortise and tenon joint, and at the same time afford an adjustment of its members to vary the height or width of a screen frame or analogous structure.

A further object of the invention is to provide a corner joint of this character adapted to be manufactured and stocked in knockdown condition, and capable of being easily and rapidly assembled and adjusted to suit the size of a window.

With these and other objects in view the invention consists in the construction and novel combination of parts hereinafter fully described, illustrated in the accompanying drawing, and pointed out in the claims appended hereto, it being understood that various changes in the form, proportion, size and minor details of construction, within the scope of the claims, may be resorted to without departing from the spirit or sacrificing any of the advantages of the invention.

Figure 1:
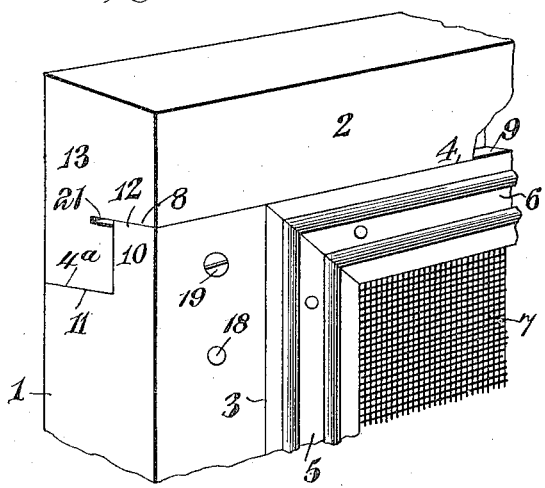
Figure 2:
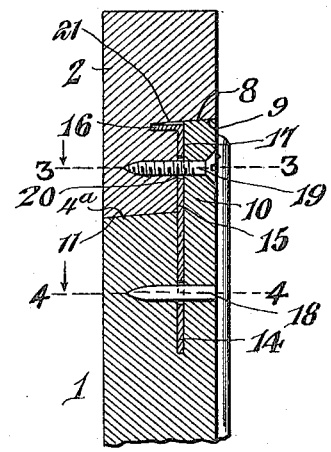
Figure 3:
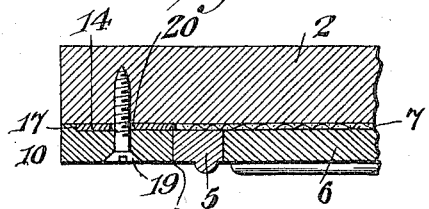
Figure 4:
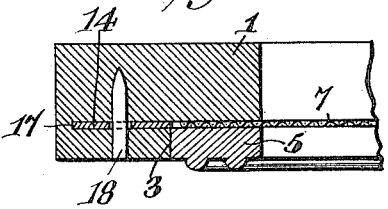
Figure 5:
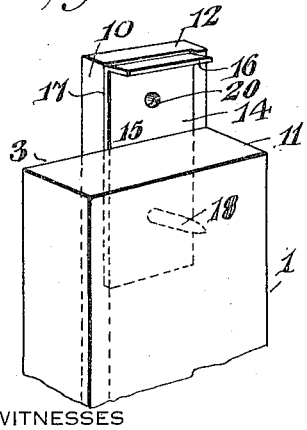
Figure 6:
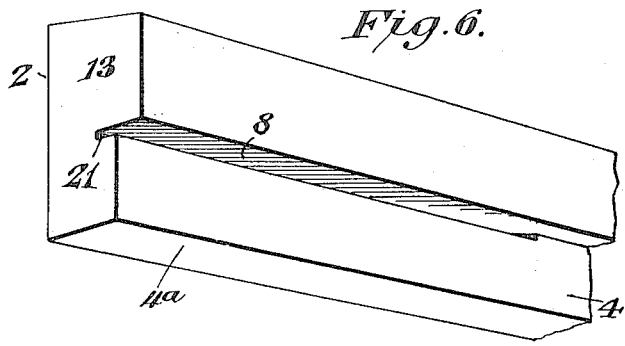

In the drawing:—Figure 1 is a perspective view of a portion of a screen provided with a corner joint constructed in accordance with this invention. Fig. 2 is a sectional view taken longitudinally of one of the bars or members of the joint. Fig. 3 is a sectional view on the line 3—3 of Fig. 2. Fig. 4 is a similar view on the line 4—4 of Fig. 2. Fig. 5 is a detail perspective view of one of the bars or members of the corner joint. Fig. 6 is a similar view of the other bar or member of the corner joint.

Like numerals of reference designate corresponding parts in all the figures of the drawing.

In the accompanying drawing, in which is illustrated the preferred embodiment of the invention, 1 and 2 designate two bars or members arranged at right angles to each other to form the corner joint of a screen or other frame, and provided at their inner edges with longitudinal recesses 3 and 4 for the reception of spline molding strips 5 and 6, which secure the marginal edges of the woven wire 7 or other screen material in the marginal recesses 3 and 4, and which are mitered at their ends, as shown. The spline molding 5 is cut from the bars or members when the same is passed through the machine in which they are shaped. The recess 4 of the bar or member 2 has a beveled wall 8 inclining downwardly and inwardly, and the molding strip 6 has its inner longitudinal edge 9 correspondingly beveled to fit the bevel of the bar or member 2. The other bar or member 1, which may be beveled at its longitudinal recess 3, is provided at the end contiguous to the bar or member 2 with a longitudinal projection 10, formed by recessing or cutting away the bar or member at 11, and having a length corresponding to the width of the longitudinal recess 4 and extending across the same, as clearly illustrated in Fig. 1 of the drawing. The end 12 of the longitudinal projection 10 is beveled to fit the bevel 8 of the bar or member 1, and the said projection is also arranged in flush relation with the end face 13 of the said bar or member 2. This arrangement causes the corner joint to present the appearance of a mortise and tenon joint.

The bars or members 1 and 2 are adjustably connected and interlocked by means of a hook 14, constructed of sheet metal or other suitable material and consisting of a shank or body portion 15 and a bill or engaging portion 16, formed by bending the terminal portion of the sheet metal at right angles, as clearly illustrated in Fig. 5 of the drawing. The shank or body portion of the hook is arranged in a kerf 17 cut in the bar or member 1 at the inner or lower face of the projection 10 and extending longitudinally of the bar or member 1 from the inner edge of the projection to within a short distance of the outer edge of the same, so that the hook will be concealed within the joint and not visible from the outer face of the bar or member 1. The hook 14 is secured in the kerf 17 by a headless pin 18 and a screw 19, which has its head counter-sunk in the projection 10. The pin, which pierces the bar 1 and the inner portion of the shank or body of the hook, has its pointed end embedded in the said bar 1 and its other end is arranged in flush relation with the outer face of the bar or member 1. The screw, which passes through the projection 10 and a perforation 20 in the outer portion of the shank or body of the hook, is embedded in the bar or member 2, as clearly shown in Fig. 3 of the drawing. The bar or member 2 is provided with a longitudinal kerf 21 extending inwardly from its end face 13 a suitable distance, say six inches more or less, and adapted to receive the engaging portion or bill 16 of the hook, whereby the bars or members 1 and 2 are slidably and adjustably interlocked. The bar or member 1 is adapted to be adjusted along the bar or member 2 to vary the size of the screen frame or other frame, and the said bar or member 2 is adapted to be trimmed off when made necessary by such an adjustment. The members of the joint are assembled by placing the projection of the bar or member 1 onto the end of the bar or member 2 and engaging the hook 14 with the kerf 21. The bar or member 1 is then tapped down into flush relation with the bar or member 2, the bevel serving to draw the parts into tight interlocked relation, which is maintained by the screw 19 after the same has been applied. With screen frames, one screw at each corner joint will be found to be ample, but in other frames, where the bars or members are of greater size, any number of fastening devices may, of course, be employed.

The bar 2 has the edge 4ᵃ beveled in substantially parallelism with the edge 8 and the cut away portion 11 of the bar 1 is correspondingly beveled so that when the screw 19 is applied the beveled surfaces 8 and 9 and the beveled surfaces 4ᵃ and 11 are brought together, and by the reaction thereupon of the bill or engaging portion 16 of the hook 14 these beveled surfaces are brought into particularly firm rigid engagement, the bevels taking up all looseness.

While the fastening member 19 has been described as a screw, it will be understood that it may be replaced by a nail or any other suitable fastening device which will serve to bring the parts into the firm union desired.

What is claimed is:—

1. A corner joint including two bars or members, one of the bars or members being provided at its inner edge with a recess and the other bar or member having a terminal projection extending across the recess and forming an overlapping joint, and a hook arranged at the inner face of the said terminal projection and secured to the bar or member carrying the same, said hook being provided with a bill engaging the recessed bar or member and also being covered by the said projection when in place.

2. A corner joint including two bars or members, one of the bars or members being provided with a recess and having a kerf extending longitudinally thereof along the inner wall of the recess, and the other bar or member being provided with a terminal projection extending across and fitting in the recess to form an overlapping joint, and a hook arranged at the inner face of the said projection and rigid with the same and having its hook portion at the end of said projection, said hook having an engaging portion or bill extending into the said kerf and slidably and adjustably interlocking the bars or members.

3. A corner joint including two bars or members, one of the bars or members being provided at its inner edge with a recess and having a kerf extending longitudinally thereof, the other bar or member being provided with a terminal projection extending across the recess to form an overlapping joint, the bar or member having the projection being also provided with a kerf extending from the inner edge of the projection and terminating short of the outer face of the same, and a hook having a shank secured in the last-mentioned kerf and provided with a projecting portion extending into the other kerf and slidably and adjustably interlocking the two bars or members.

4. A corner joint including two bars or members longitudinally recessed to fit together and correspondingly beveled where abutting, and one of the bars being provided at its recessed portion with a longitudinal kerf, and a hook fast to the other bar and provided with a projecting portion adapted to enter the kerf, whereby when the bars are brought into engagement at the joint the hook and the beveled abutting portions of the bars coact to force the beveled portions into firm engagement.

5. A corner joint including two bars at right angles to each other with one bar provided with a longitudinal recess and the other bar with a longitudinal projection entering the recess, the meeting edges of the two bars being beveled, and a device extending along the inner face of the projection of the second bar and lodged in the recess of and entering the first bar, said device being covered by the projection.

6. A corner joint including two bars at right angles to each other with one bar provided with a longitudinal recess and the other bar with a longitudinal projection entering the recess, the meeting edges of the two bars being beveled, and a device extending along the inner face of the projection of the second bar and lodged in the recess of and entering the first bar, said device being covered by the projection, and the second bar having a longitudinal recess corresponding to and matching that of the first bar for the reception of molding strips.

In testimony, that we claim the foregoing as our own we have hereto affixed our signatures in the presence of two witnesses.

FREDERICK W. VAN FLEET.
RODNEY S. VAN FLEET.

Witnesses:
L. A. CONKLIN,
HELEN PHILLIPS.

Copies of this patent may be obtained for five cents each, by addressing the "Commissioner of Patents, Washington, D. C."